US010156219B1

United States Patent
Lucido et al.

(10) Patent No.: US 10,156,219 B1
(45) Date of Patent: Dec. 18, 2018

(54) METHOD FOR CONTROLLING SPARK TIMING IN A COLD START CONDITION FOR AN ENGINE IN A VEHICLE PROPULSION SYSTEM AND CONTROLLER FOR EXECUTING THE METHOD

(71) Applicant: GM GLOBAL TECHNOLOGY OPERATIONS LLC, Detroit, MI (US)

(72) Inventors: Michael J Lucido, Northville, MI (US); Robert S Levy, Leonard, MI (US)

(*) Notice: Subject to any disclaimer, the term of this patent is extended or adjusted under 35 U.S.C. 154(b) by 0 days.

(21) Appl. No.: 15/822,684

(22) Filed: Nov. 27, 2017

(51) Int. Cl.
*F02P 5/14* (2006.01)
*F02P 5/15* (2006.01)
*F01N 3/20* (2006.01)
*F02P 5/00* (2006.01)

(52) U.S. Cl.
CPC .......... *F02P 5/1506* (2013.01); *F01N 3/2006* (2013.01); *F02P 5/00* (2013.01); *F02P 5/14* (2013.01); *F02P 5/151* (2013.01); *F01N 2430/08* (2013.01); *F01N 2900/1602* (2013.01)

(58) Field of Classification Search
CPC .... F02P 5/00; F02P 5/14; F02P 5/1506; F02N 3/2006; F02N 2430/08; F01N 2900/1602
USPC ........................................ 123/406.55, 406.53
See application file for complete search history.

(56) References Cited

U.S. PATENT DOCUMENTS

| 6,334,431 | B1 * | 1/2002 | Kanehiro | F02P 5/045 |
| | | | | 123/406.53 |
| 7,856,309 | B2 | 12/2010 | Gillanders et al. | |
| 7,900,601 | B2 | 3/2011 | Gwidt et al. | |
| 8,364,376 | B2 | 1/2013 | Wang et al. | |
| 8,775,054 | B2 | 7/2014 | Vincenz et al. | |
| 8,989,989 | B2 | 3/2015 | Sczomak et al. | |
| 9,719,389 | B2 | 8/2017 | Grewal et al. | |
| 9,816,454 | B1 | 11/2017 | Anderson et al. | |
| 2004/0149253 | A1 * | 8/2004 | Kikuchi | F02D 37/02 |
| | | | | 123/295 |
| 2008/0236144 | A1 * | 10/2008 | Nakata | F02D 37/02 |
| | | | | 60/284 |
| 2015/0136097 | A1 * | 5/2015 | Hoshi | F02D 19/0615 |
| | | | | 123/575 |
| 2015/0152793 | A1 * | 6/2015 | Matsuda | F02D 17/00 |
| | | | | 60/285 |

FOREIGN PATENT DOCUMENTS

| JP | 2000240547 A | * | 9/2000 | ................ F02P 5/15 |
| JP | 2006090166 A | * | 4/2006 | ................ F02D 1/18 |
| JP | 2009214704 A | * | 9/2009 | ........... B60W 10/06 |
| JP | WO 2014119354 A1 | * | 8/2014 | ........... G02B 6/4249 |

* cited by examiner

*Primary Examiner* — Mahmoud Gimie

(57) ABSTRACT

A method and a controller for controlling spark timing in a cold start condition for an engine in a vehicle propulsion system. The method includes determining whether the engine is in a cold start condition, and advancing spark timing before top dead center in a combustion cycle such that combustion heat is primarily received by a surface in a combustion chamber in the engine if the engine is in a cold start condition.

13 Claims, 4 Drawing Sheets

METHOD FOR CONTROLLING SPARK TIMING IN A COLD START CONDITION FOR AN ENGINE IN A VEHICLE PROPULSION SYSTEM AND CONTROLLER FOR EXECUTING THE METHOD

FIELD

The present disclosure relates to a method for controlling a spark timing in a cold start condition for an engine in a vehicle propulsion system and a controller for executing the method.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Catalytic converters may be used to reduce gaseous emissions from an engine in a vehicle propulsion system. Generally, catalytic converters are more efficient at elevated temperatures. For example, "a light-off temperature" may be a temperature where the conversion of combustion gases by the catalyst in the converter may have reached a desired level of efficiency. To more quickly increase the temperature of the catalytic converter, especially in a cold start condition, ignition timing may be retarded such that the heat from combustion is primarily directed into the exhaust and to the catalytic converter.

SUMMARY

As explained above, during a cold start mode an engine may go through a "cat light-off mode" where ignition timing may be retarded such that the primary heat of combustion goes to the catalytic converter so that the temperature of the catalysts in the converter quickly reach an efficient conversion temperature and/or an "activation" temperature. However, while this may address conversion of gas emissions, this strategy does not address the problem of particulate emissions. The inventors of the present disclosure understood that the impingement of fuel on cold combustion surfaces, which are present during a cold start, results in that fuel producing particulates. In general, the colder the surface, the more particulates in the emissions.

The present inventors realized that particulate emissions may be significantly reduced by controlling the spark timing during a cold start such that the heat of combustion is primarily directed to warming the surfaces of the combustion chamber. In stark contrast, to conventional spark timing which tends to retard timing during a cold start to direct the combustion heat to a catalytic converter, an exemplary embodiment of the present disclosure advances the spark timing such that combustion heat is primarily directed to a surface in a combustion chamber in the engine during a cold start mode. In this manner, particulate emissions may be significantly reduced during a cold start mode.

Further, not only are particulate emissions significantly reduced, but the heating of the combustion surfaces in the combustion chamber improves the efficiency of combustion for subsequent operating modes, such as, for example, in a catalytic heating mode where the spark timing is retarded. By first heating the combustion surfaces when the engine is in a cold start condition in accordance with the present disclosure, the amount of time that is required to operate in a catalytic heating mode, where spark timing may be retarded, may be significantly reduced. Thus, with the present disclosure, the particulate emissions may be reduced while simultaneously reducing the amount of time for the catalytic heating mode to operate before reaching a desired catalyst temperature, which may also further reduce gas emissions.

Additionally, an exemplary embodiment of the present disclosure provides improved combustion stability during cold start conditions. During a cold start, any combustion instability may result in a combustion strategy that may be noticed by a driver of a vehicle. The driver or passenger may note that the engine is operating in a manner which may contrast from "normal" operation. The amount of time in which the engine may be required to operated "abnormally" from the perspective of the driver during a cold start condition may be significantly reduced by an exemplary embodiment of the present disclosure.

In an exemplary aspect, a method and a controller for controlling spark timing in a cold start condition for an engine in a vehicle propulsion system. The method includes determining whether the engine is in a cold start condition, and advancing spark timing before top dead center in a combustion cycle such that combustion heat is primarily received by a surface in a combustion chamber in the engine if the engine is in a cold start condition.

In another exemplary aspect, the spark timing is before about thirty degrees before top dead center.

In another exemplary aspect, the method further includes determining when a combustion surface exceeds a predetermined threshold temperature and retarding the spark timing to a timing after the spark timing in which the combustion heat is primarily received by the surface of the combustion chamber.

In another exemplary aspect, determining when a combustion surface exceeds a predetermined threshold temperature includes determining when a piston surface exceeds the predetermined threshold temperature.

In another exemplary aspect, the predetermined threshold temperature exceeds an evaporation temperature of a fuel for the engine.

In another exemplary aspect, the predetermined threshold temperature is greater than about one hundred forty degrees Celsius.

In another exemplary aspect, retarding the spark timing to a timing after the spark timing in which the combustion heat is primarily received by the surface of the combustion chamber includes retarding the spark timing to a timing where the combustion heat is primarily sent to an exhaust catalyst.

In another exemplary aspect, the method further includes adjusting a fuel injection timing to correspond to the spark timing such that combustion heat is primarily received by a surface in a combustion chamber in the engine if the engine is in a cold start condition.

In another exemplary aspect, the method further includes determining whether the engine has reached a predetermined speed and advancing the spark timing before top dead center in a combustion cycle such that combustion heat is primarily received by a surface in a combustion chamber in the engine if the engine is in a cold start condition and the engine speed has reached the predetermined speed.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

When fuel contacts a cold surface the fuel is unable to evaporate and mix thoroughly with the engine charge air. Combustion of liquid fuel produces locally fuel-rich combustion zones that result in the formation of undesirable particulate emissions. Thus, the amount of particulates produced by an engine may be greater when surfaces in the engine are cold as compared to when the pistons are at a typical operating temperature. The surfaces in the combustion chamber may be cold when the engine has been shut off for a period of time.

For example, further adjusting fuel injection based upon a piston temperature deviation may reduce fuel puddles form forming on piston surfaces. Preventing fuel puddles from forming on piston surfaces in an engine may reduce the amount of particulate matter produced by the engine.

Figure 1:
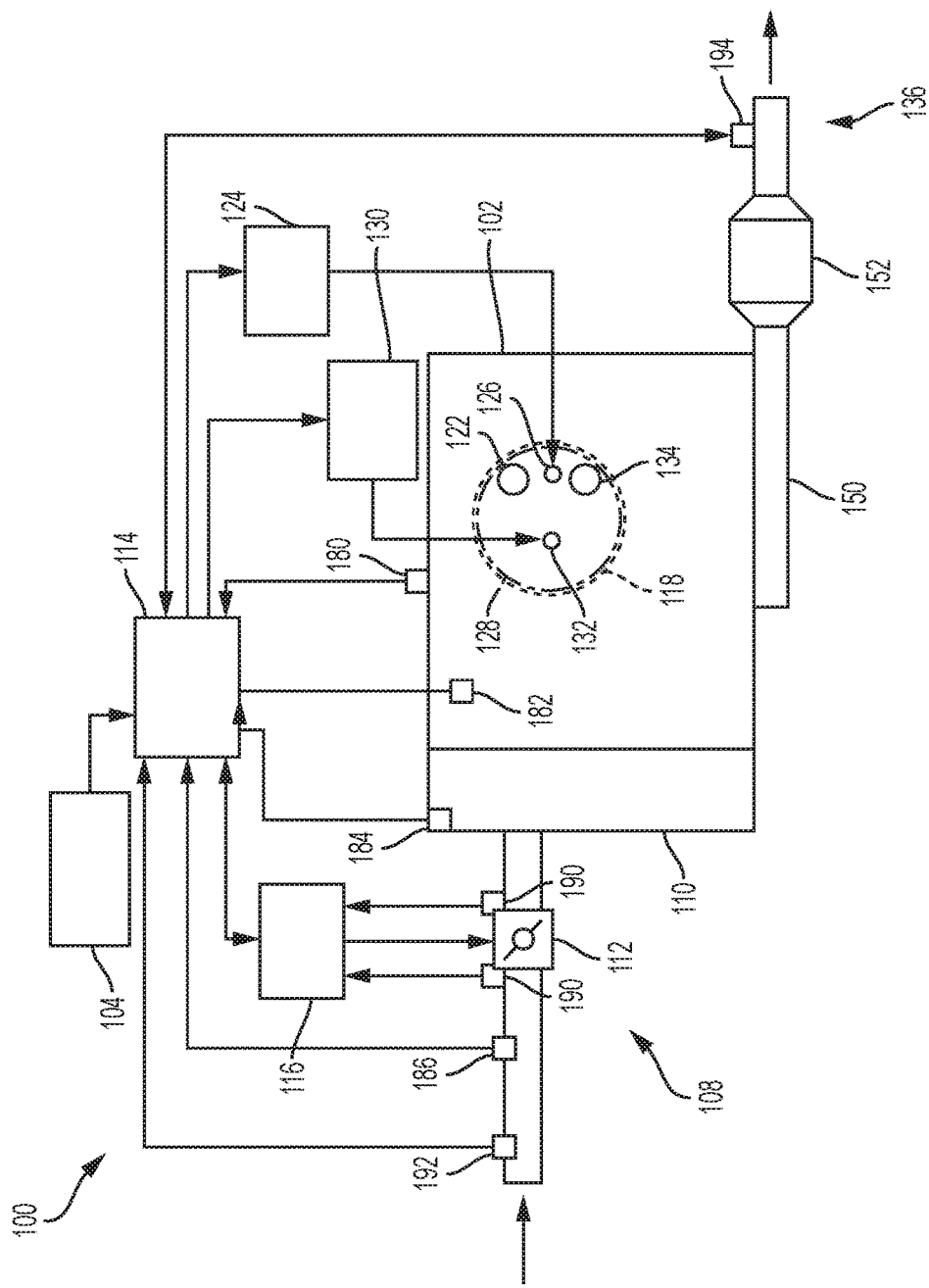
FIG. 1 is a functional block diagram of an engine system according to an exemplary embodiment of the present invention.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The driver input may include, for example, an accelerator pedal position and/or a cruise control setting. The cruise control setting may be received from a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112, which may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes are the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates a fuel injector 126 to achieve a desired air/fuel ratio. As presently shown, the fuel injector 126 injects fuel directly into the cylinders. Additionally or alternatively, fuel may be injected into mixing chambers associated with the cylinders. Additionally, fuel may be injected into the intake manifold 110 at a central location or at multiple locations, such as near the intake valve 122 of each of the cylinders. The fuel actuator module 124 may halt injection of fuel to cylinders that are deactivated.

During the compression stroke, a piston 128 within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine (e.g., a spark ignition direct injection (SIDI) engine), in which case a spark actuator module 130 energizes a spark plug 132 in the cylinder 118 based on a signal from the ECM 114, which ignites the air/fuel mixture. The timing of the spark may be specified relative to the time when the piston is at its topmost position, referred to as top dead center (TDC).

The spark actuator module 130 may be controlled by a timing signal specifying how far before or after TDC to generate the spark. Because piston position is directly related to crankshaft rotation, operation of the spark actuator module 130 may be synchronized with crankshaft angle. In various implementations, the spark actuator module 130 may halt provision of spark to deactivated cylinders.

Generating the spark may be referred to as a firing event. The spark actuator module 130 may have the ability to vary the timing of the spark for each firing event. The spark actuator module 130 may even be capable of varying the spark timing for a next firing event when the spark timing signal is changed between a last firing event and the next firing event. In various implementations, the engine 102 may include multiple cylinders and the spark actuator module 130 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 134. The byproducts of combustion are exhausted from the vehicle via an exhaust system 136.

The exhaust system 136 may include a catalytic converter 152. The catalytic converter 152 may be located downstream from and adjacent to an exhaust manifold 150.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 is measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 is measured using a mass air flow (MAF) sensor 186. In various implementations, the MAF sensor 186 may be located in a housing that also includes the throttle valve 112.

The throttle actuator module 116 monitors the position of the throttle valve 112 using one or more throttle position sensors (TPS) 190. The ambient temperature of air being drawn into the engine 102 is measured using an intake air temperature (IAT) sensor 192. The air/fuel ratio of exhaust gas output by the engine 102 is measured using an air/fuel ratio (AFR) sensor 194. The ECM 114 uses signals from the sensors to make control decisions for the engine system 100. For example, the ECM 114 estimates a steady state piston temperature and a piston temperature deviation from that steady state temperature and then adjusts, for example, injection timing, injection pressure, injection location, and/or a number of injections per engine cycle based on the piston temperature.

Figure 2:
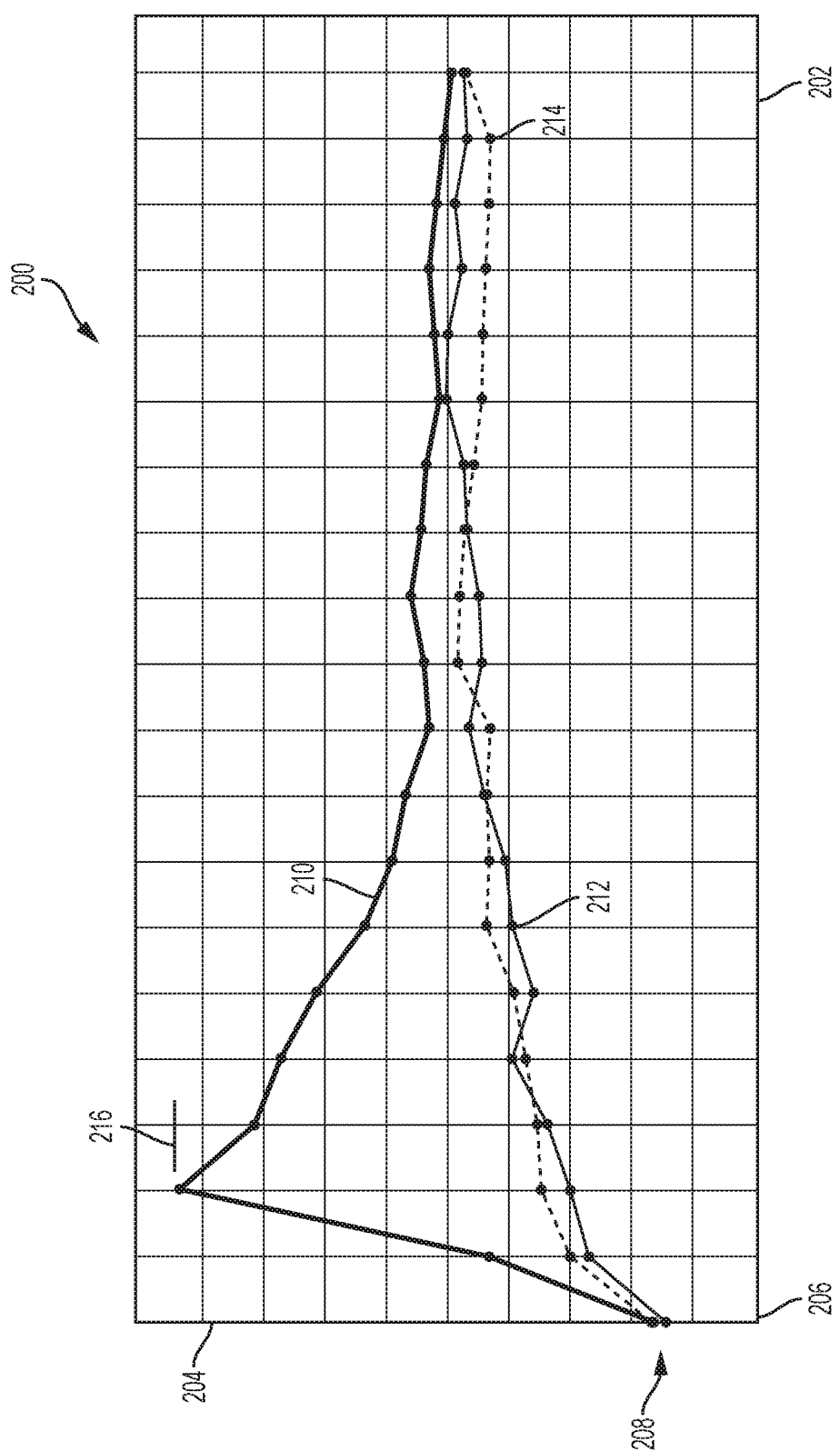
FIG. 2 is a graph of combustion chamber surface temperatures during various spark timing strategies for an engine in a cold start condition.

Referring now to FIG. 2, FIG. 2 is a graph 200 of combustion chamber surface temperatures during various spark timing strategies for an engine in a cold start condition. The horizontal axis 202 of the graph represent the passage of time and the vertical axis 204 of the graph represents a surface temperature in a combustion chamber of an engine. As is illustrated in the graph 200, at time 206 the combustion chamber surface temperature for all three strategies is substantially the same at 208. The temperature at 208 represents a combustion chamber having a cold surface temperature. Impingement of fuel on a cold surface leads to a high amount of particulate emissions that are produced during combustion. In accordance with an exemplary embodiment of the present disclosure, the spark timing is advanced such that the heat of combustion is directed and received by a surface in the combustion chamber, this is illustrated by line 210 in graph 200. As can be clearly seen, the surface temperature of the combustion chamber during application of an exemplary embodiment of the present invention, as illustrated by line 210, increases dramatically. That dramatic increase in surface temperature stands in stark contrast to the surface temperatures that result from conventional spark timing strategies, represented by lines 212 and 214, which tend to retard the timing so that the heat of combustion leaves the combustion chamber, enters the exhaust and is directed to and received by a catalytic converter. The difference in strategies, which result in the temperature/time lines 212 and 214 is that the injection/spark timing strategy for line 212 is later than that of the injection/spark timing strategy for line 214.

In accordance with the exemplary embodiment of the strategy which result in the temperature/time line 210, when the temperature reaches a predetermined temperature 216, the spark/injection timing strategy may then stop advancing the spark timing and then enter another spark/injection timing strategy. In the instance illustrated by line 210, when the surface temperature reaches the predetermined temperature 216, the spark/injection timing is retarded so that the combustion heat is now directed to the catalytic converter to raise the temperature of the catalyst in the heater to an activation temperature.

Figure 3:
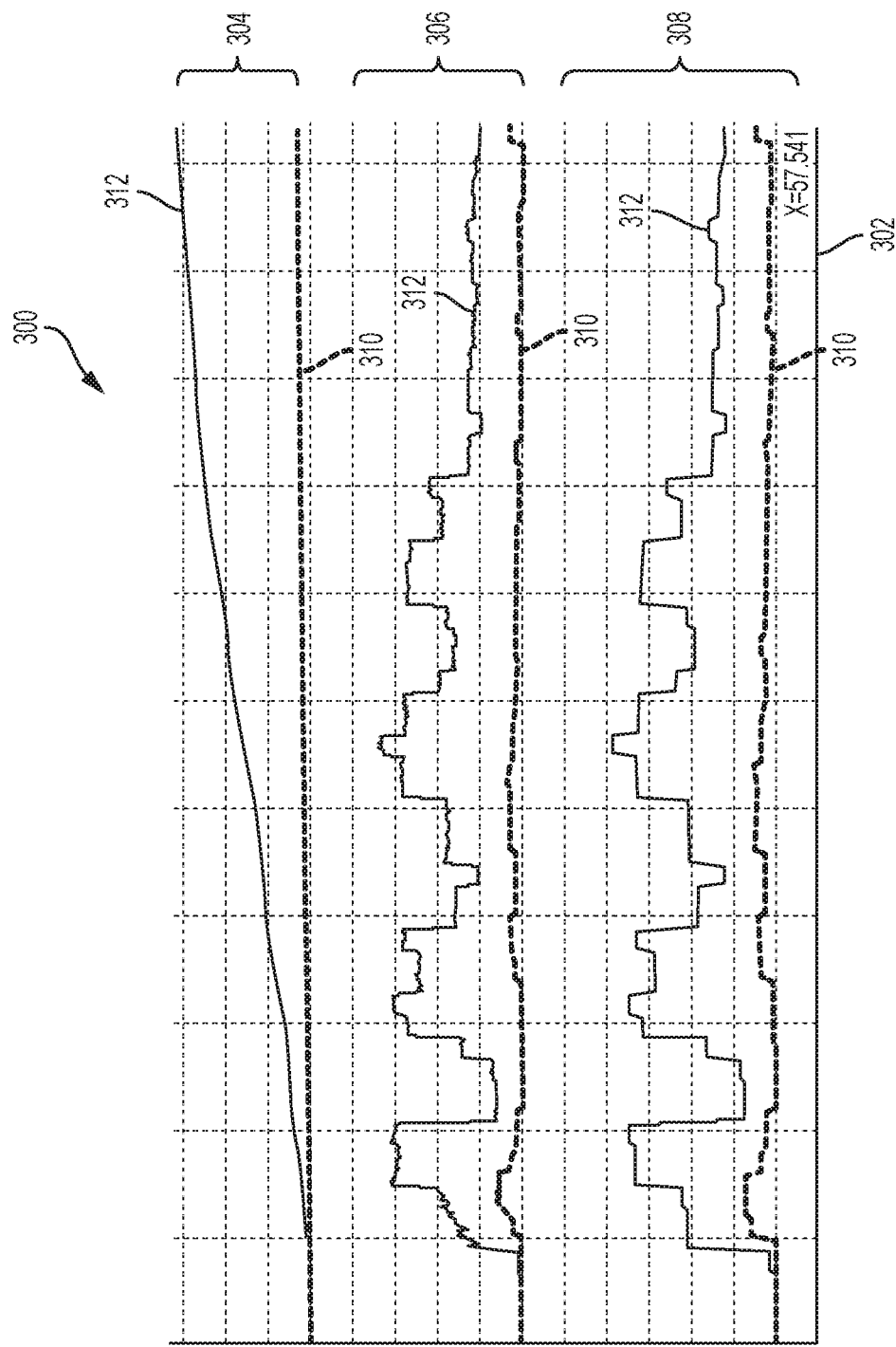
FIG. 3 is a graph illustrating particulate emissions for alternative cold start strategies, one of which is in accordance with the present invention.

Referring now to FIG. 3, the dramatic reduction in particulate emissions which may be achieved with an exemplary embodiment of the present disclosure is illustrated by graph 300. The horizontal axis 302 of graph 300 represents the passage of time and the vertical axis of graph 300 is divided into three sections: the vertical axis of section 304 represents the cumulative amount of particulates being generated; the vertical axis of section 306 represents the instantaneous measure of the rate of particulate generation; and the vertical axis of section 308 represents the instantaneous measure of the concentration of particulate emissions. The results for each section of the graph 300 which results from the application of an advanced spark timing in accordance with an exemplary embodiment of the present disclosure is represented by line(s) 310. Those results stand in stark contrast to the much higher level of particulates that are generated by application of a conventional spark timing strategy as represented by line(s) 312. In the example illustrated by graph 300, the particulates that are generated by the advanced spark timing strategy may be reduced by about 90% compared to conventional cold start spark timing strategies.

Figure 4:
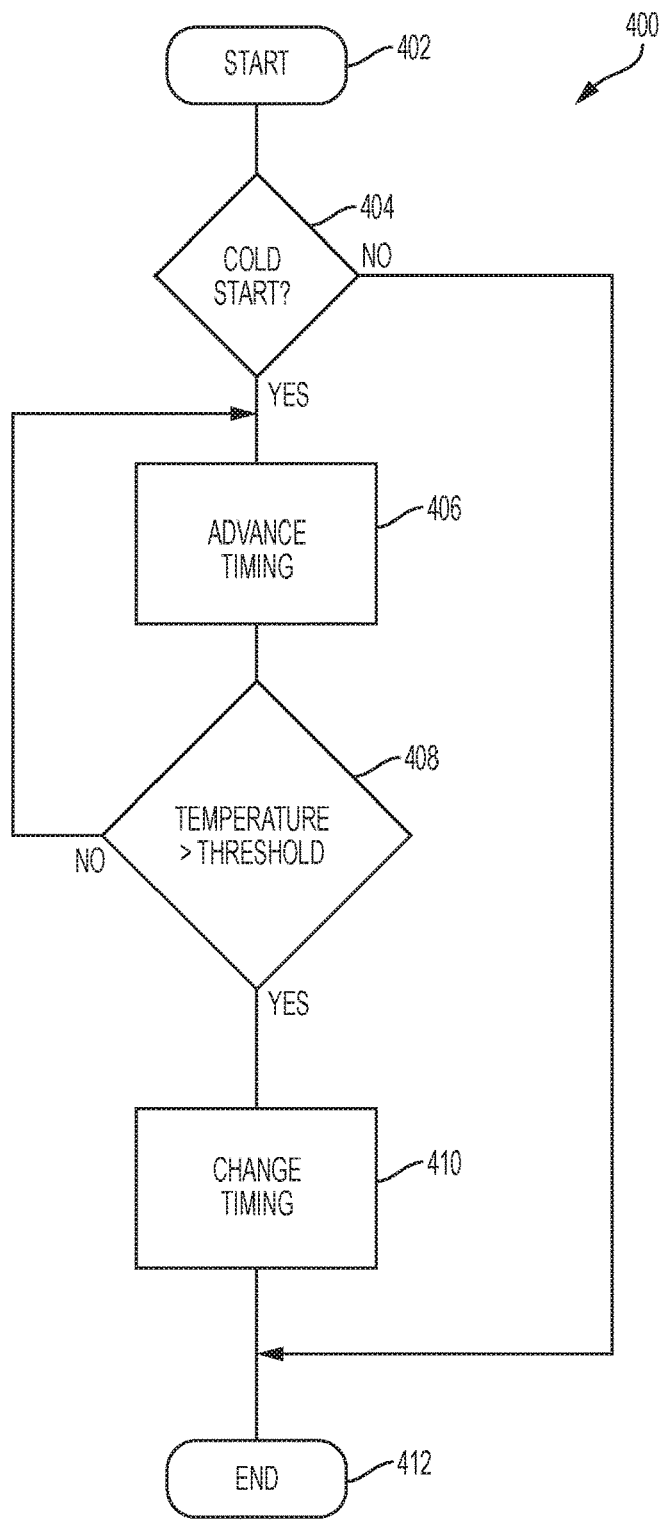
FIG. 4 is a flowchart illustrating an engine control method according to an exemplary embodiment of the present invention.

FIG. 4 illustrates a flowchart 400 of an exemplary method in accordance with the present disclosure. The method starts at step 402 and continues to step 404. At step 404, a controller determines whether the engine is in a cold start condition. If, at step 404, the controller determines that the engine is not in a cold start condition, then the method jumps to step 412. If, however, in step 404, the controller determines that the engine is in a cold start condition then the method continues to step 406. In step 406, the controller advances the spark timing of the engine such that combustion heat is directed to a surface of a combustion chamber and continues to step 406. In step 408, the controller determines whether a surface temperature of the combustion chamber exceeds a predetermined threshold. If, in step 408, the controller determines that the surface temperature of the combustion chamber does not exceed the predetermined threshold, then the method returns to step 406. If, however, in step 408, the controller determines that a surface temperature of the combustion chamber exceeds a predetermined threshold, then the method continues to step 410. In step 410, the controller changes the spark timing such that the heat of combustion is no longer directed at a surface of the combustion chamber and continues to step 412. In step 412, the method ends.

While the present disclosure explains that the timing of spark during a combustion cycle is advanced such that the heat of combustion is directed toward a surface of the combustion chamber, it is to be understood that the fuel injection strategy may need to be adjusted in accordance with the advanced spark timing strategy in order for that to be effective. In general, when advancing the spark timing, the fuel injection timing may also need to be advanced in order to optimize the effect of the advanced spark timing and gain the most effective amount of combustion heat transfer to a surface of a combustion chamber. Further, and similarly, the overall spark strategy may be adjusted such that the number of injections per combustion cycle, the pressure of the fuel, and the like without limitation which may affect the effectiveness of the advanced spark timing to direct combustion heat to a surface of a combustion chamber.

In an exemplary embodiment, the spark timing may be advanced to at least about 20 degrees before top dead center (BTDC) with respect to the crankshaft angle in the combustion cycle. Typical spark timing strategies tend to reduce spark during a cold start condition. For example, a conventional cold start timing strategy may time the spark at about 10 degrees after top dead center (i.e. −10 degrees BTDC). With an advanced spark timing, the combustion occurs earlier in the combustion cycle and is shifted earlier in the combustion cycle such that at least a portion of that combustion may occur during the late compression stroke which results in an increase in the amount of combustion heat that is directed into a surface of a combustion chamber. In a preferred, exemplary embodiment, the spark timing may be advanced to between about 30 and 40 degrees BTDC.

Conventional cold start spark strategies may retard the spark timing in order to direct the heat of combustion to a catalytic converter and/or the spark timing may be based upon some other conventional metric such as one that may be based upon optimizing a mean base torque (MBT) of an engine. In contrast to these conventional spark timing strategies, an exemplary embodiment may advance the spark timing such that the heat of combustion is directed to a surface of a combustion chamber which may result in little to no torque being produced.

In accordance with an exemplary embodiment of the present disclosure, the advanced timing strategy which directs combustion heat to a surface of the combustion chamber may be initiated after a controller determines that the engine is in a cold start condition. The cold start condition may be indicated by any number of factors, such as, for example, a low engine coolant temperature and the like, without limitation. Further, in an exemplary embodiment of the present disclosure, the advanced timing strategy may not be initiated until after the combustion conditions during a cold start has sufficiently stabilized. For example, during a cold start, in an exemplary embodiment, the advanced spark timing strategy may not be initiated until after the engine has reached a stabilized idle speed. Conventionally, in any engine start strategy, including a cold start strategy, spark timing is not advanced because an advanced spark timing reduces the amount of torque which may lead to a stalled engine. Therefore, conventional engine start strategies have avoided advancing the spark timing to avoid engine stalling.

In an exemplary embodiment of the present disclosure, the advanced timing strategy may be continued until the surface temperature reaches a predetermined threshold. That predetermined threshold may correspond to, for example, an evaporation temperature of the fuel.

In an exemplary embodiment of the present disclosure, a controller may determine the temperature of a surface of a combustion chamber using, for example, a piston surface temperature model, a cylinder wall temperature model, or any other surface temperature determination systems and methods without limitation. Exemplary systems and methods for modeling a piston surface temperature is disclosed within co-assigned U.S. Pat. Nos. 8,989,989 and 9,816,454, the disclosures of which are both incorporated herein in their entirety. In an exemplary embodiment, when a piston surface temperature model indicates that a piston surface temperature may exceed a predetermined threshold, the spark timing advancement for directing combustion heat into a surface of a combustion chamber may be changed in a manner which may then direct the combustion heat elsewhere such as, for example, to a catalytic converter to increase its temperature to an activation temperature.

In another exemplary embodiment, the predetermined threshold temperature may be selected based upon factors other than a fuel evaporation temperature such as, for example, a temperature which may have an adverse effect upon the components of the combustion chamber. In some engines, a combustion chamber surface may be made from an aluminum alloy which may be sensitive to elevated temperatures. The predetermined threshold may be selected such that the aluminum alloy in these engines are not adversely affected.

In another exemplary embodiment of the present disclosure, even after the spark timing strategy is no longer advanced to direct heat to a combustion chamber surface, the surface temperature may continue to be modeled and/or monitored, and the spark timing strategy may again be advanced if the surface temperature drops below a minimum predetermined threshold. In this manner, even after the initial cold start, particulates from combustion may continue to be minimized and combustion efficiency may continue to be optimized. This strategy may be useful in particular with engines having a large mass which may quickly absorb the heat from the combustion chamber surfaces until that engine warms up. The surface temperature of the combustion chamber may, as a result, quickly drop and may benefit from additional combustion surface heating to minimize particulates.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for controlling spark timing in a cold start condition for an engine in a vehicle propulsion system, the method comprising:
   determining whether the engine is in a cold start condition;
   advancing spark timing before top dead center in a combustion cycle such that combustion heat is primarily received by a surface in a combustion chamber in the engine if the engine is in a cold start condition;
   determining when a combustion surface temperature exceeds a predetermined threshold temperature; and
   retarding the spark timing to a timing after the spark timing in which the combustion heat is primarily received by the surface of the combustion chamber, wherein the predetermined threshold temperature exceeds an evaporation temperature of a fuel for the engine.

2. The method of claim 1, wherein the spark timing is before about thirty degrees before top dead center.

3. The method of claim 1, wherein said determining when a combustion surface temperature exceeds a predetermined threshold temperature comprises determining when a piston surface temperature exceeds the predetermined threshold temperature.

4. The method of claim 1, wherein the predetermined threshold temperature is greater than about one hundred forty degrees Celsius.

5. The method of claim 1, wherein retarding the spark timing to a timing after the spark timing in which the combustion heat is primarily received by the surface of the combustion chamber comprises retarding the spark timing to a timing where the combustion heat is primarily sent to an exhaust catalyst.

6. The method of claim 1, further comprising adjusting a fuel injection timing to correspond to the spark timing such that combustion heat is primarily received by a surface in a combustion chamber in the engine if the engine is in a cold start condition.

7. A controller for a vehicle propulsion system, wherein the controller is programmed to:
- determine whether the engine is in a cold start condition;
- advance spark timing before top dead center in a combustion cycle such that combustion heat is primarily received by a surface in a combustion chamber in the engine if the engine is in a cold start condition;
- determine when a combustion surface temperature exceeds a predetermined threshold temperature; and
- retard the spark timing to a timing after the spark timing in which the combustion heat is primarily received by the surface of the combustion chamber, wherein the predetermined threshold temperature exceeds an evaporation temperature of a fuel for the engine.

8. The controller of claim 7, wherein the spark timing is before about thirty degrees before top dead center.

9. The controller of claim 7, wherein the controller is programmed to determine when a combustion surface temperature exceeds a predetermined threshold temperature by determining when a piston surface temperature exceeds the predetermined threshold temperature.

10. The controller of claim 7, wherein the predetermined threshold temperature exceeds an evaporation temperature of a fuel for the engine.

11. The controller of claim 7, wherein the predetermined threshold temperature is greater than about one hundred forty degrees Celsius.

12. The controller of claim 7, wherein the controller is programmed to retard the spark timing to a timing after the spark timing in which the combustion heat is primarily received by the surface of the combustion chamber by retarding the spark timing to a timing where the combustion heat is primarily sent to an exhaust catalyst.

13. The controller of claim 7, wherein the controller is further programmed to adjust a fuel injection timing to correspond to the spark timing such that combustion heat is primarily received by a surface in a combustion chamber in the engine if the engine is in a cold start condition.

* * * * *